Sept. 11, 1934.  L. I. FRIEDLAENDER  1,973,562
CAR LOADING DEVICE
Filed Aug. 14, 1931
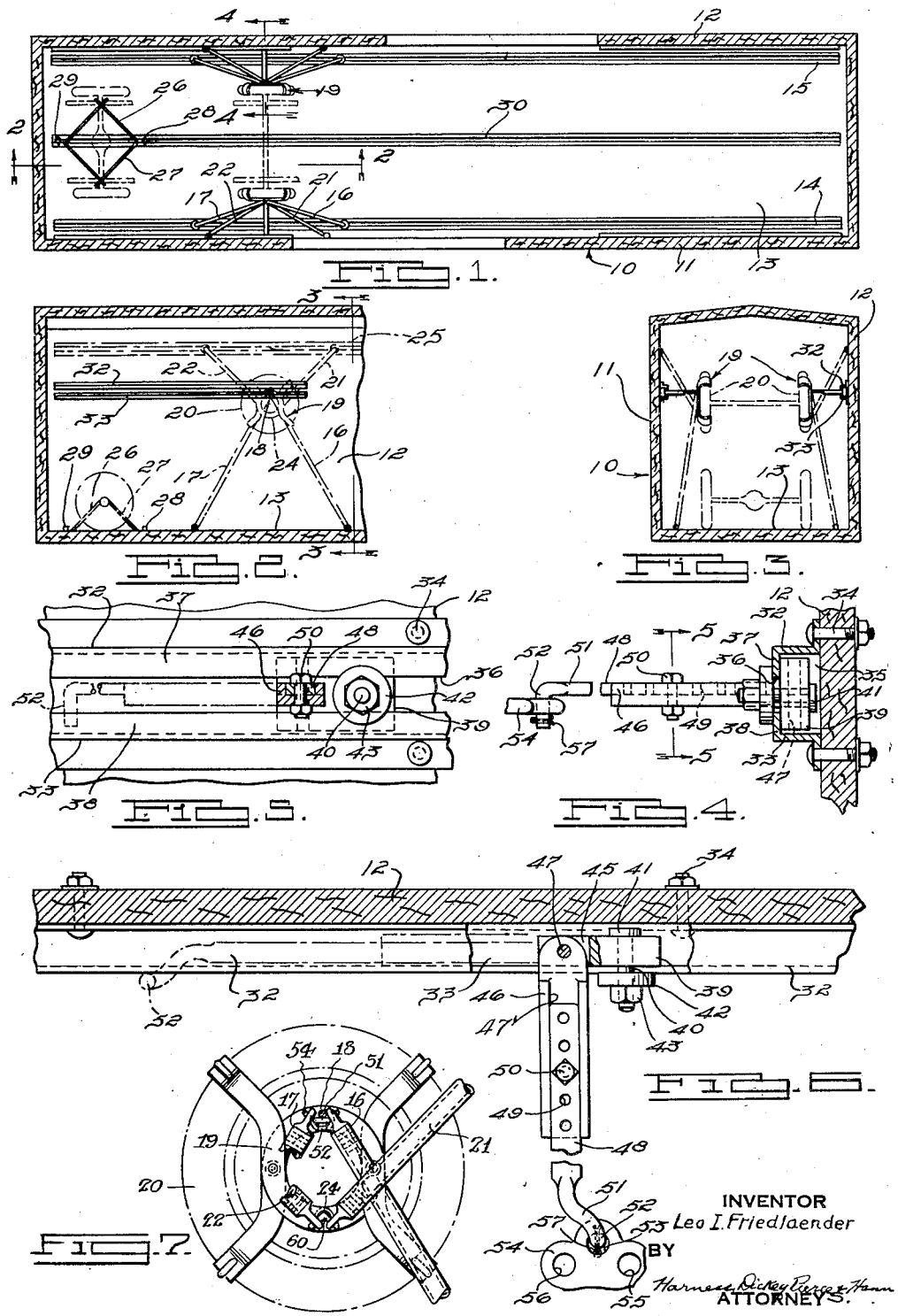
INVENTOR
Leo I. Friedlaender
BY
ATTORNEYS Patented Sept. 11, 1934

1,973,562

UNITED STATES PATENT OFFICE 1,973,562

CAR LOADING DEVICE

Leo I. Friedlaender, Detroit, Mich., assignor, by mesne assignments, to The Worth Company, a corporation of Michigan Application August 14, 1931, Serial No. 557,056

1 Claim. (Cl. 105—368)

The invention relates to loading devices and it has particular relation to devices for securing motor vehicles in freight cars for transportation purposes.

The invention constitutes an improvement over that embodied in the application for patent of Samuel D. Butterworth, Serial No. 557,055, filed August 14, 1931.

In the above mentioned application for patent, lazy tong tire embracing means are supported in mid-air in a freight car by thrust rods connected to the lazy tongs and to the floor of the car. Other rods, also connected to the lazy tongs, are connected to an upper part of the freight car and serve to hold the lazy tongs and tires engaged thereby, in proper positions. The pairs of thrust rods at opposite sides of the car for supporting the tires converge slightly in an upward direction and consequently any side swaying of the vehicle supported thereby, is resisted. The upper pairs of rods connected to the lazy tongs converge downward slightly and assist in preventing side movement of the vehicle. The several rods are anchored to the freight car in an adjustable manner which permits supporting the vehicle in various inclined positions as well as permitting the accommodation of vehicles of various sizes.

The principal objects of the present invention are to provide laterally directed supporting members for positively preventing any side sway of the vehicle and also for preventing undesirable contracting of the lazy tongs about the tires which might otherwise occur because the thrust rods normally tend to contract the lazy tongs about the tire; and to provide supporting members for this purpose which are so adjustable that they will cooperate with the remaining parts of the apparatus for accommodating vehicles of various sizes, and for positioning such vehicles in various inclined planes.

For a better understanding of the invention reference may be had to the accompanying drawing forming a part of the specification, wherein:

Fig. 1 is a longitudinal cross-sectional view of a freight car having car loading devices therein constructed according to one form of the invention;

Fig. 2 is a cross sectional view, taken substantially along line 2—2 of Fig. 1;

Fig. 3 is a cross sectional view, taken substantially along line 3—3 of Fig. 2;

Fig. 4 is a cross sectional view, on a larger scale, taken substantially along line 4—4 of Fig. 1;

Fig. 5 is a cross sectional view, taken substantially along line 5—5 of Fig. 4;

Fig. 6 is a plan view of the construction shown by Fig. 4, illustrating particularly the manner in which the laterally directed supporting members are moved into and out of their operative positions.

Fig. 7 is a detail view illustrating the lazy tong arrangement which may be employed.

Referring to Fig. 1, a freight car 10 is illustrated which comprises the usual side walls 11 and 12, and a floor 13. The floor is provided with longitudinally extending grooves 14 and 15 at opposite edges thereof and each of these grooves is of undercut character, as particularly set forth in the previously mentioned application for patent. These grooves are provided with adjustable anchoring devices for supporting thrust rods 16 and 17 which converge upwardly and slightly toward the center of the car and at their upper end are connected to a pivot bolt 18 forming part of a lazy tong 19 embracing a tire 20 of a vehicle. Other rods 21 and 22 converge downwardly from an upper part of the car, and are connected at their lower ends to a pivot 24 also forming a part of the lazy tong. The upper ends of the rods 21 and 22 are adjustably anchored in grooves 25 in the side walls of the freight car in substantially the same manner that the lower ends of the rods 16 and 17 are anchored in the grooves 14 and 15.

In the construction particularly illustrated, the wheels at the ends of one axle are supported by lazy tongs engaging the tires, but the rear axle of the vehicle is connected to the floor of the freight car by means of pairs of members 26 and 27 engaging the axle, and anchoring devices 28 and 29 adjustably mounted in a groove 30 extending longitudinally and centrally of the floor. It will be apparent, however, that the wheels on such rear axle may be also supported by lazy tongs in a similar manner as the front tires are supported, although preferably the rear tires will be nearer the floor in order to position the vehicle in an inclined plane.

According to the present invention, oppositely disposed Z-bars 32 and 33 are secured to the walls of the freight car by means of bolts 34, it being understood that each wall is provided with a pair of Z-bars. The Z-bars on each wall are so arranged as to provide a longitudinally extending recess 35 which communicates with the interior of the car through a slot 36 formed between legs 37 and 38 of the bars. A block 39 adjustably mounted in the recess 35 is of such dimensions that it will engage the undersides of the legs 37 and 38 of the Z-bars and hence will be normally maintained in the recess although movable longitudinally therein. As best shown by Fig. 6, a bolt 40 extends through the slot 36, through the block 39 and is provided with a head 41 on its inner end which normally prevents removal of the bolt from the block.

A collar 42 on the outer end of the bolt is adapted to engage the outer sides of the legs 37 and 38, and a nut 43 on the bolt outwardly of the collar, serves to clamp the legs 37 and 38 of the Z-bars between the block 39 and the collar. When the nut is loosened, it is apparent that the block may be moved longitudinally in the recess 35 and then secured by tightening the nut, in any adjusted position.

One end of the block 39 is provided with a slot 45 for accommodating one end of an arm 46 which is pivotally connected to the block by means of a pin 47. Outwardly of the pin 47, the arm 46 is provided with a groove 47' which receives a second arm 48 complementarily fitting the groove. The arm 48 is provided with a series of openings 49 by means of which the two arms may be adjustably connected by a bolt 50 and hence the effective length of both arms varied. The thickness of the arms 46 and 48 when considered together, is such that they may be moved about the pin 47 and into the slot 36 between the legs 37 and 38 of the Z bars and hence into an out-of-the-way position.

The outer end of arm 48 terminates in an offset portion 51 terminating in a hook 52, the offset portion 51 permitting movement of the arms 46 and 48 into the slot 36 with the exception of the hook 52 which normally remains outside of the slot, as shown by Fig. 6. The hook 52 is adapted to engage an opening 53 formed in a member 54 which is integral or otherwise rigidly connected to the pivot 18 connecting upper ends of thrust rods 16 and 17 to the lazy tong. The member 54 has other openings 55 and 56 provided for the purpose of connecting the upper ends of the thrust rods to the pivot.

The thrust rods 21 and 22 similarly are connected at their lower ends to a member 60 integral with the lower pivot 24 of the lazy tongs as shown by Fig. 7.

When a vehicle is supported in the freight car by means of the lazy tongs, the arms 46 and 48 are moved into positions such as that shown by Fig. 6, and the hook 52 is engaged with the opening 53 and then a cotter pin 57 is inserted in an opening in the extreme end portion of the hook to prevent its removal from the opening. Then, or previous to this time, the effective lengths of the arms 46 and 48 may be varied as desired by varying the position of the bolt 50. When the parts are so arranged, it is apparent that the lazy tongs at opposite ends of the axle are prevented from moving laterally and hence side swaying of the vehicle is avoided. Hence the arms 46 and 48 serve as members for taking lateral thrusts. During transportation of the vehicle in the freight car, frequently, movement of the latter as, for example, when rounding a curve, will cause the vehicle to move toward one side wall of the freight car and, since the vehicle has considerable weight, the desirability of thrust members for taking the thrust exerted by such movement of the vehicle is clearly apparent. In this connection it is to be noted that when the vehicle moves toward one side wall of the freight car, one pair of arms 46 and 48 serves as a thrust element while the pair of arms at the other side serves as a tension element instead of a thrust element.

Car loading devices of the character described and illustrated are particularly efficient in operation for the purpose of maintaining a vehicle in proper position during transportation thereof which is highly desirable. It is apparent that the devices mentioned are adapted to accommodate various sizes of cars and maintain such vehicles in various positions inclined with respect to the floor of the car. Moreover, it is apparent that the lateral thrust taking elements being adjustable can be arranged to prevent even slight lateral movement of the vehicle. The provision of devices of this character which can be disposed in out-of-the-way positions when vehicles are not being transported is also desirable, because it permits ordinary use of the car for other purposes without interference from the vehicle supporting devices.

Although only one form of the invention has been illustrated and described in detail, it will be apparent to those skilled in the art that various modifications may be made without departing from the scope of the appended claim.

I claim:

In a freight car, a lazy tong for engaging a tire of a vehicle and supporting it in elevated position, members connected to a pivot of the lazy tong for vertically supporting the latter, and a laterally directed member also connected to the pivot and adapted to be connected to a side wall of the car for side bracing purposes.

LEO I. FRIEDLAENDER.